(12) United States Patent
Aeberhard

(10) Patent No.: US 6,902,013 B2
(45) Date of Patent: Jun. 7, 2005

(54) ELECTRIC POWER TOOL WITH A PLURALITY OF OPERATIONAL COMPONENT GROUPS ACCOMMODATED IN SEPARATE HOUSINGS

(75) Inventor: Bruno Aeberhard, Studen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/743,197

(22) Filed: Dec. 22, 2003

(65) Prior Publication Data

US 2004/0149077 A1 Aug. 5, 2004

(30) Foreign Application Priority Data

Dec. 24, 2002 (DE) .......................................... 102 61 025

(51) Int. Cl.[7] .............................................. E21B 19/18
(52) U.S. Cl. ....................................................... 173/213
(58) Field of Search ................................ 403/329, 326; 173/216, 217, 213; 310/43

(56) References Cited

U.S. PATENT DOCUMENTS

| | | | |
|---|---|---|---|
| 3,908,139 A | * 9/1975 | Duncan, Jr. .................. 310/50 |
| 4,065,045 A | * 12/1977 | Pray ............................ 227/147 |
| 4,791,833 A | * 12/1988 | Sakai et al. .................. 475/299 |
| 4,892,433 A | * 1/1990 | Schreiber ................. 403/359.1 |
| 5,196,747 A | 3/1993 | Kress et al. |
| 5,220,224 A | 6/1993 | Bosman et al. |
| 5,313,125 A | * 5/1994 | Bosman et al. ........... 310/49 R |
| 5,521,785 A | 5/1996 | Schmidt et al. |
| 5,599,143 A | * 2/1997 | Dusing ........................ 408/124 |
| 5,624,000 A | * 4/1997 | Miller ........................ 173/216 |
| 5,768,942 A | 6/1998 | Gruber et al. |
| 6,431,289 B1 | * 8/2002 | Potter et al. ................... 173/47 |
| 6,435,285 B1 | * 8/2002 | Tsai ............................ 173/178 |
| 6,558,089 B2 | * 5/2003 | DeBlasio ................ 408/239 A |
| 6,660,955 B1 | 12/2003 | Bues |
| 6,798,111 B1 | * 9/2004 | Petersen ..................... 310/254 |

* cited by examiner

Primary Examiner—Rinaldi I. Rada
Assistant Examiner—Paul Durand
(74) Attorney, Agent, or Firm—Michael J. Striker

(57) ABSTRACT

An electric power tool has a plurality of operational component groups; a plurality of separate housings which accommodate the operational component groups, the housings being couplable with one another in series, at least one of the housings being composed of a synthetic plastic casing which is reinforced with a metal sleeve.

9 Claims, 1 Drawing Sheet

ELECTRIC POWER TOOL WITH A PLURALITY OF OPERATIONAL COMPONENT GROUPS ACCOMMODATED IN SEPARATE HOUSINGS

BACKGROUND OF THE INVENTION

The present invention relates to an electric power tool with a plurality of operational component groups accommodated in separate housings, wherein the individual housings are axially coupled in series to one another.

Such an electric power tool is disclosed for example in U.S. Pat. No. 4,791,833. In accordance with this patent, a motor housing is coupled with a transmission housing of an electric power tool through a screw connection. Screw connections require relatively high mounting expenses. The housings which accommodate different operational component groups of an electric power tool are conventionally composed of synthetic plastic, since the synthetic plastic provides the advantage of lighter weight and easier manufacture. The electric power tools are often subjected to high mechanical loads. In the case when the electric power tool with a height from 1 m to 2 m holds, in certain conditions the housing in which the drive spindle of the power tool is supported, it does not withstand the occurring transverse forces.

SUMMARY OF THE INVENTION

Accordingly, it is an object of the present invention to provide a hand power tool of the above mentioned general type, which is simpler to manufacture and to mount and in addition is very robust against mechanical loads.

In keeping with these objects and with others which will become apparent hereinafter, one feature of the present invention resides, briefly stated in an electric power tool, comprising a plurality of operational component groups; a plurality of separate housings which accommodate said operational component groups, said housings being couplable with one another in series, at least one of said housings being composed of a synthetic plastic casing which is reinforced with a metal sleeve.

When the electrical power tool is designed in accordance with the present invention, the synthetic plastic casing provides for a possibility of a very simple realization for manufacture of operational elements, such as threads, projections, extensions and the like, for example by conventional synthetic plastic injection molding technique.

The metal sleeve which reinforces the synthetic plastic casing provides for a sufficiently high stability, which protects the housing from destruction in the event of a very high load applied to the electric power tool.

In accordance with an advantageous embodiment of the present invention, the metal sleeve is embedded in the synthetic plastic casing. This can be done by injection molding of the synthetic plastic casing around the metal sleeve.

In accordance with a further feature of the present invention, the metal sleeve is preferably bringable in engagement with a holder, which is provided for the coupling of the housings. Therefore the forces which act on the metal sleeve are distributed via the holder to the other housings, so that the load of the individual housings smaller.

In accordance with another feature of the present invention, a very simple holder from the mounting point of view, for coupling the housings which are arranged axially one behind the other, has a spring-elastic belt, which is placeable outwardly around one of the housings so as to at least partially coaxially surround the housing. A plurality of gripping arms extend from the belt in an axial direction and have ends engageable with one or several housings which adjoin the housing surrounded by the belt.

A first housing which accommodates a drive component group can be coupled with a second housing which accommodates a transmission, and the second housing can be coupled with a third housing for accommodating the means for guiding and supporting a driven shaft. Preferably, the holder is placeable around the second housing, and the holder is provided with gripping arms which are engageable with the first and/or the third housing, so that by providing the engagement a force-transmitting and/or form-locking connection between the gripping arms of the holder and the metal sleeves associated with the first and/or second housing is provided.

In accordance with another preferable embodiment of the present invention, the advantageous connection of the individual housings can be performed through a bayonet-look connections.

In accordance with a further advantageous embodiment of the holder, the ends of the gripping arms are formed as arresting hooks and the housings are provided with arresting means, with which the arresting hooks can be brought in engagement. It is advantageous when in the wall of the at least one housing, both in its synthetic plastic casing and also its metal sleeve, through going slots are provided for engagement of the arresting hooks.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

An electric power tool, for example a power screwdriver or a power drill, conventionally includes a plurality of operational component groups. Such operational component groups can include a drive unit, for example an electric motor, a single-stage or a multi-stage transmission unit, and a unit for holding and supporting a driven shaft, which is connected with a tool holder for example for holding of a screwing bit or a drilling and for transmission of rotation thereto.

Figure 1:
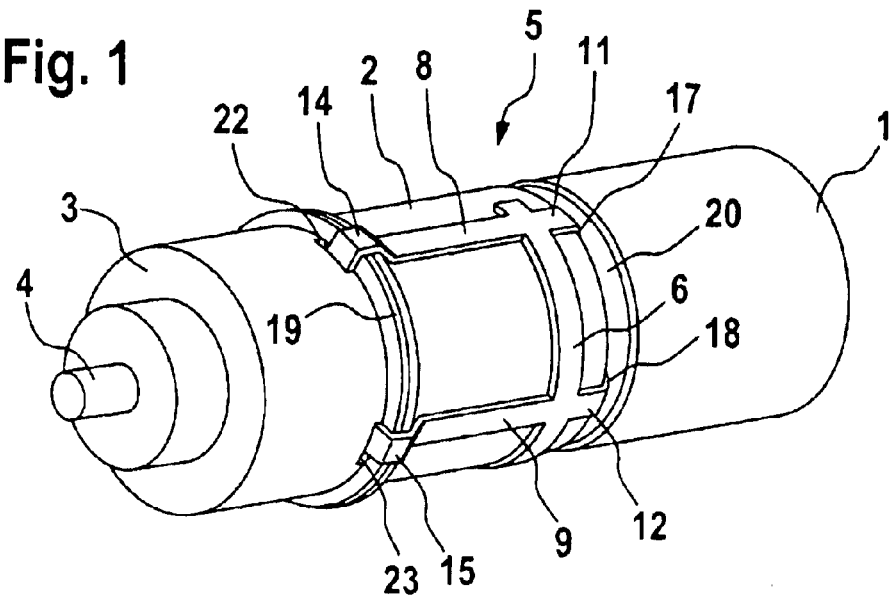
FIG. 1 is a perspective view showing a plurality of housings with operational structure groups of an electric power tool, which are coupled with one another.

As schematically shown in FIG. 1, each operational component group is accommodated in its own housing 1, 2, 3. The drive unit is located in a first housing 1. The transmission is located in the second housing 2 which is connected to the housing 1. The holders and bearings for the driven shaft 4 of the electric hand power tool or a spindle arresting device or an adjusting mechanism for a selection between screwing, drilling or impacting are located for example in a third housing 3 which follows the second housing 2.

The three housings 1, 2, 3 are located axially in series one after the other and connected with one another in a force transmitting and/or form-locking manner. A simple coupling for the three housings 1, 2, 3, which does not require mounting tools, can be realized through bayonet connecting devices. The bayonet connection mounting tools are well known in the art, they are not described here in detail and not shown in detail in the drawings. The housings 1, 2, 3 shown in FIG. 1 have a cylindrical cross-section. However, the invention is not limited to this housing shape, and instead can be used with other housing shapes as well.

When the housings 1, 2, 3 are not screwed with one another but instead are axially coupled with one another, a holder 5 is provided for reliably connecting the housings with one another and thereby prevent their loosening. The holder 5 can be placed on the housings 1, 2, 3 without the use of a tool. FIG. 1 shows the holder 5 which is placed on the housings 1, 2, 3 coupled with one another. A complete holder can be seen in FIG. 2 on a perspective view of the holder 5, released from the housings 1, 2, 3.

The holder 5 has a spring-elastic belt or strap 6. The belt 6 is formed so that it can be placed outwardly around one of the housings, to at least partially coaxially surround the housing. Since the housing 2 around which the belt 6 of the holder 5 is wound, has a cylindrical shape, the belt 6 has the shape of a circular arc. The belt 6 does not form a completely closed circle, but instead is open at one side, so that it can be slid laterally onto the housing 2. Because the belt is spring-elastic, a certain clamping action is produced for the belt 6 on the outer periphery of the housing 2. When the housing 2, on which the holder 5 must be placed, has another shape which deviates from a circular cross-section, the belt 6 must also be provided with a corresponding shape which deviates from the circular arc.

Three gripping arms 7, 8, 9 and 10, 11, 12 branch from the belt 6 in an axial direction toward the first housing 1 and toward the third housing 3, which housings are located near the second housing 2. In the embodiment of the holder 5 shown in the drawings, the gripping arms 7, 8, 9 branch in the device longer than the gripping arms 10, 11, 12 which branch in the opposite direction. The different lengths of the gripping arms 7, 8, 9 and 10, 11, 12 are not absolutely necessary. The length of the gripping arms depend on the location where the belt 6 surrounds the housing 2. The gripping arms 7, 8, 9, 10, 11, 12 in any case have such a length that they can reach the corresponding neighboring housing 1.

Inwardly oriented arresting hooks 13, 14, 15 and 16, 17, 18 are provided at the ends of the gripping arms 7, 8, 9 and 10, 11, 12. The arresting hooks 13, 14, 15 of the gripping arms 7, 8, 9 extend toward the third housing 3, engage over a shoulder 19 which is formed in the third housing 3 and extends around it. The arresting hooks 16, 17, 18 of the gripping arms 10, 11, 12 which extend to the first housing 1 engage a circular groove 20 which is provided on the periphery of the first housing 1.

In deviation from the shown embodiment, the means for arresting the gripping arms 7, 8, 9, and 10, 11, 12 can be formed in another desirable way. With the spring-elastic properties of the gripping arms 7, 8, 9, and 10, 11, 12 with the arresting hooks 13, 14, 15, 16, 17, 18, the holder 5 provides a certain pulling action on the first housing 1 and the third housing 3 in direction to the central second housing 2, and ensures a reliable seat of the three housings 1, 2, 3 in the axial direction.

Figure 2:
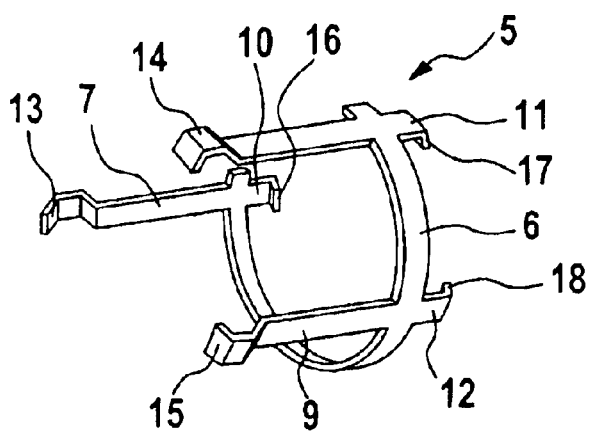
FIG. 2 is a perspective view of a holder placeable on the housing of the inventive electric power tool in accordance with the present invention.

In the embodiment shown in FIGS. 1, 2, the holder 5 is formed so that its gripping arm 7, 8, 9 and 10, 11, 12 engage both the first housing 1 and the third housing 3. When only two housings must to be fixed by the holder 5, the gripping arms are formed so that on the one hand they engage with the housing around which the belt 6 of the holder 5 is wound, and on the other hand they engage with the neighboring housing.

Figure 3:
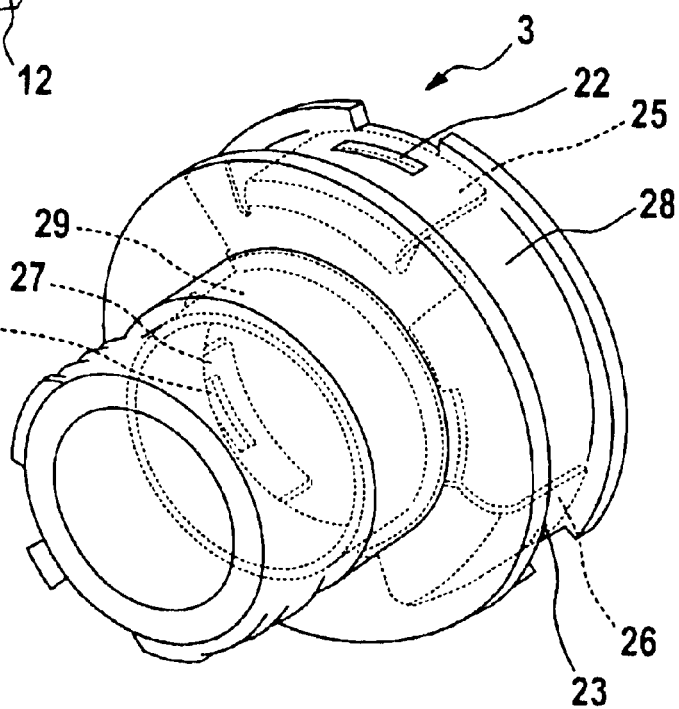
FIG. 3 is a perspective view of a housing with an embedded metal sleeve, of the electric power tool in accordance with the present invention.

FIG. 3 shows a perspective view of the housing 3, which receives the holder and the bearing for the driven shaft 4. The housing 3 is composed of a synthetic plastic casing 28 which is reinforced with a metal sleeve 29. Preferably, the metal sleeve 29 is embedded in the synthetic casing 28. The metal sleeve 29 is composed for example of a deep drawn steel, around which the synthetic plastic casing is injection-molded. The metal sleeve 29 must not be necessary embedded in the synthetic plastic casing, but instead it can be placed on the inner side or on the outer side of the synthetic plastic casing 28. For the electrical insulation, however the embedding of the metal sleeve 29 in the synthetic plastic casing 28 is preferable. By reinforcing of the synthetic plastic housing 3 with the metal sleeve 29, the housing 3 obtains a very high breaking strength.

In the embodiment shown in FIG. 3, a part of the metal sleeve 29 has a cylindrical shape, and three arms 25, 26, 27 extend from the cylinder correspondingly into the regions of the synthetic plastic casing 28 which is provided with slots 22, 23, 24. The arresting hooks 13, 14, 15 of the gripping arms 7, 8, 9 of the holder 5 engage in the slots 22, 23, 24. The slots 22, 23, 24 extend through the arms 25, 26, 27, so that the arresting hooks 13, 14, 15 of the holder 5 engage not only in the synthetic plastic casing 28, but also in the metal sleeve 29. Thereby the holder 5 with the metal sleeve 29 obtain a form locking and/or a force transmitting connection.

Because of the above mentioned connection, the forces which for example in the case of the electric power tool are transmitted from the driven spindle 4 to the housing 3, are distributed via the metal sleeve 29 to the holder 5 and via the holder to the further housing 2. With the presence of the metal sleeve 29 which reinforces the synthetic plastic casing 28 of the housing, in cooperation with the holder 5, forces which act on the housing 3 which supports the drive spindle 4 are substantially absorbed, so that the breaking risk for the synthetic plastic casing 28 of the housing 3 is significantly reduced.

It will be understood that each of the elements described above, or two or more together, may also find a useful application in other types of constructions differing from the types described above.

While the invention has been illustrated and described as embodied in electric power tool with a plurality of operational component groups accommodated in separate housings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electric power tool, comprising a plurality of operational component groups; a plurality of separate housings which accommodate said operational component groups, said housings being coupled with one another in series, at least one of said housings being composed of a synthetic plastic casing which is reinforced with a metal sleeve, and a holder provided for coupling of said housings, wherein said holder includes a spring-elastic belt which is placed outwardly on at least one of said housings so as to coaxially partially surround said at least one housing, said holder further including a plurality of gripping arms which branch in an axial direction from said belt and have ends engaged with at least another housing which adjoins said at least one housing surrounded by said belt.

2. An electric power tool as defined in claim 1, wherein said metal sleeve is embedded in said synthetic plastic casing.

3. An electric power tool as defined in claim 1, wherein said metal sleeve being in engagement with said holder.

4. An electric power tool as defined in claim 1, wherein said component groups include a drive component group, a transmission, and means for guiding and supporting a driven shaft, said housings including a first housing which accommodates said drive component group, a second housing which is coupled with said first housing and accommodates said transmission, and a third housing which is coupled with said second housing and accommodates said means for guiding and supporting a drive shaft, said holder being placed on said second housing and provided with gripping arms which are engaged with at least one of said first housing and said third housing so as to provide a connection selected from the group consisting of a force transmitting connection, a form-locking connection and both between said gripping arms of said holder and a metal sleeve of a respective one of said first and/or said third housings.

5. An electric power tool as defined in claim 4, wherein at least one of said first and third housings has a wall provided with slots which extend both through said synthetic plastic casing and through said metal sleeve for engagement by said arresting hooks.

6. An electric power tool as defined in claim 5, wherein at least one of said first and third housings has a wall provided with slots which extend both through said synthetic plastic casing and through said metal sleeve for engagement by said arresting hooks.

7. An electric power tool as defined in claim 1; and further comprising a bayonet connection device which couples said housings with one another.

8. An electric power tool as defined in claim 1, wherein said ends of said gripping arms are formed as arresting hooks, said first and/or said third housings being provided with arresting means with which said arresting hooks are in engagement.

9. An electric power tool as defined in claim 8, wherein at least one of said first and third housings has a wall provided with slots which extend both through said synthetic plastic casing and through said metal sleeve for engagement by said arresting hooks.

* * * * *